(No Model.)

J. S. STEWART & F. STONE.
PIPE COUPLING.

No. 385,148. Patented June 26, 1888.

WITNESSES:
Gustave Dieterich
T. F. Bourne

INVENTORS,
James S. Stewart
Frederick Stone
BY
Bresen & Steel
ATTORNEYS.

UNITED STATES PATENT OFFICE.

JAMES S. STEWART, OF PHILADELPHIA, PENNSYLVANIA, AND FREDERICK STONE, OF BROOKLYN, NEW YORK.

PIPE-COUPLING.

SPECIFICATION forming part of Letters Patent No. 385,148, dated June 26, 1888.

Application filed April 22, 1887. Serial No. 235,739. (No model.)

*To all whom it may concern:*

Be it known that we, JAMES S. STEWART, of Philadelphia, Philadelphia county, Pennsylvania, and FREDERICK STONE, of Brooklyn, Kings county, New York, have invented a new and Improved Pipe-Coupling, of which the following is a full, clear, and exact description.

The object of our invention is to produce an expansion or slip coupling or sleeve to connect gas and water pipes and provide for expansion and contraction of the pipes, which coupling will also permit the pipes to be set at an angle to the coupling in order to avoid obstructions.

The invention consists in a coupling having an internal annular bead or rib which is integral with said coupling and embraces the entering pipe; also, in the combination of such a coupling with a peculiar packing, and also in combining a slip-joint with a screw-joint in one coupling, as will be more fully hereinafter set forth.

Reference is to be had to the accompanying drawings, forming part of this specification, in which—

Figure 1:
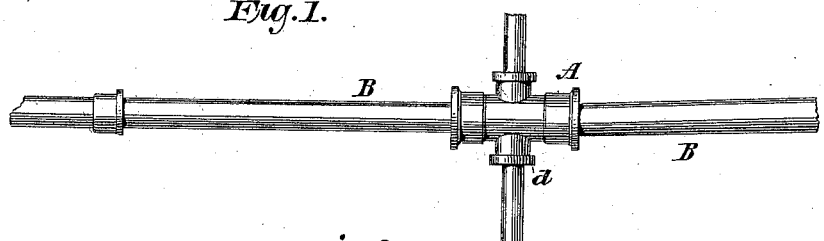
Figure 2:
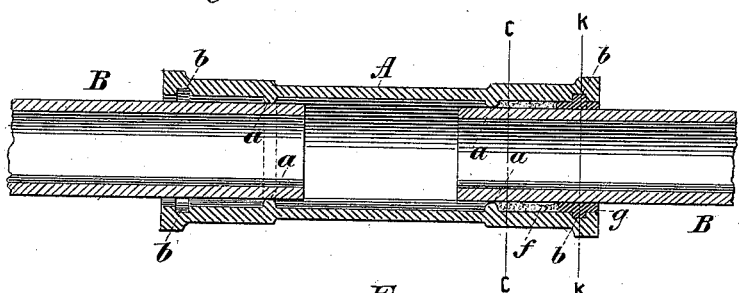
Figure 3:
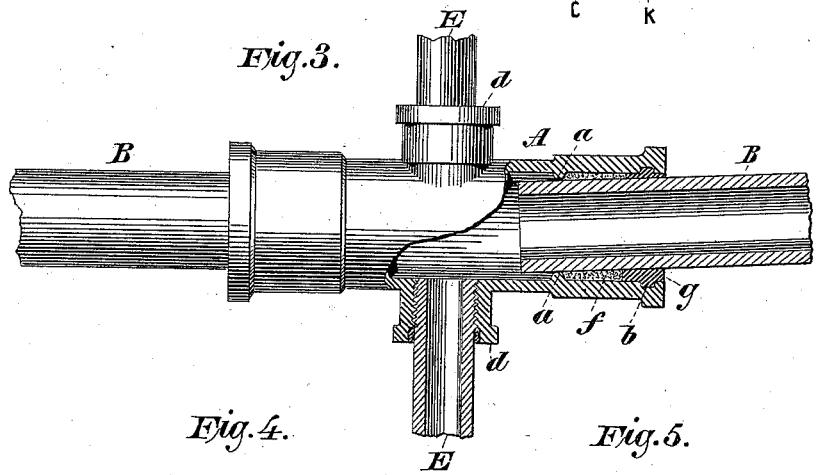
Figure 4:
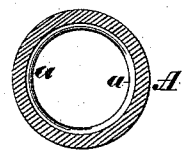
Figure 5:
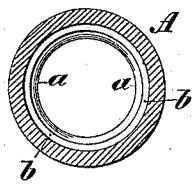

Figure 1 is a face view of a series of pipes provided with our improved expansion coupling or sleeve. Fig. 2 is a longitudinal sectional view taken through the center of our improved coupling and through the pipes entering same. Fig. 3 is a side view, partly in section, of our improved coupling, showing the manner of securing pipes in same. Fig. 4 is a cross-section of the coupling alone on line *c c*, Fig. 2; and Fig. 5 is a cross-section of the coupling alone on line *k k*, Fig. 2.

Heretofore couplings for slip-joints in pipes have been formed with a contracted portion on the inside into which the end of a pipe was inserted, and which contracted portion embraced the entire end of the pipe; but difficulty is found in laying pipes with this form of sleeve when an obstruction—such as a stone, for instance, is met, as the pipe cannot possibly be deflected from a straight line. With our improvement this difficulty is overcome, and we are enabled to set the pipe at an angle to the sleeve to avoid ordinary obstructions. This we accomplish by making our sleeve or coupling in the following manner:

A in the drawings represents a pipe coupling or sleeve. At a proper distance from the end of this sleeve A on the inner wall is formed integral therewith an annular bead or rib, *a*, of rounded form, and still nearer the end is or may be formed a recess, *b*, as clearly seen in Figs. 2 and 3.

B is the pipe to be united to the coupling. In using our slip-coupling the end of the pipe B is passed into the coupling A and a little beyond the rib *a*, which rib embraces the pipe B at a distance from its inner end. Elastic packing *f* is then tapped in against the rib *a* around the pipe B. A lead packing, *g*, is then run into the coupling A around the pipe B, against the packing *f*, and fills the recess *b*, (see Figs. 2 and 3,) which holds it securely in place. When an obstruction—such as a stone, for instance—in placing the pipe in position is met, the pipe B may be deflected in the coupling in order to avoid the obstruction, as shown on the right-hand end of Fig. 3. This deflection is permitted by the rounded rib *a*, on which the pipe B can be tilted, as shown. In a solid and straight contraction of the pipe A such deflection would be impossible, as the inner end of the pipe B would be in the grasp of the contracted part. When the length of pipe B contracts or expands, it will slip along through the packing *f g* and on the rib *a*; but as the end of the pipe B projects inward from the rib *a* the pipe will not slip off said rib, but will always be embraced thereby. With this construction of coupling the contraction and expansion of the pipes can take place whether they be in a right line or at an angle to the sleeve without disturbing the tightness of the joint. Another advantage of this slip-joint is that by the interposition of the flexible packing *f* between the lead packing *g* and the rib *a* the excessive leakage now common in slip-joints is very much reduced if not entirely obviated.

With the slip-joint of the above construction we also combine at times a screw-coupling, *d*, which permits connection with other pipes, E E. In this case one or more openings of the coupling-piece A may have the slip-joint and the remainder have screw-joints. The screw-joints, if not at once used for connection with pipes E, can be closed with suitable screw-caps. A coupling-piece having slip-joints and screw-joints in one structure has not, to our knowledge, been heretofore employed.

Having now described our invention, what we claim is—

1. In an expansion or slip coupling for pipes, the cylindrical sleeve A, having the annular rounded rib $a$ integral therewith on its inner wall, and a groove, $b$, between said rib and the end of the sleeve, in combination with the cylindrical pipe B, said rounded rib being adapted to embrace the pipe B at a distance from its end and to hold the pipe B at a distance from the inner wall of the sleeve A, so that its end may be deflected within the coupling, and to serve also as a guide for longitudinal displacement of the pipe B, the groove $b$ being adapted to securely hold lead packing against the pipe B, substantially as and for the purpose herein shown and described.

2. In an expansion or slip coupling for pipes, the combination of the sleeve A, having internal annular rib, $a$, integral therewith, and groove $b$ between the end of the sleeve and the rib $a$, with the elastic packing $f$ between said rib and said groove, lead packing $g$ in said groove, and pipe B, said pipe B being adapted to be embraced by the rib $a$ and thereby be held at a distance from the inner wall of the sleeve A, so that its end may be deflected within the coupling, substantially as herein shown and described.

3. The coupling A, constructed with the internal rib, $a$, integral therewith, and groove $b$ between the end of the coupling and the rib $a$, both forming an expansion and deflectible joint and with the threaded branch $d$ for non-expansion joint, substantially as described, and for the purposes herein set forth.

JAS. S. STEWART.
FRED. STONE.

Witnesses:
GUSTAV SCHNEPPÉ,
HARRY M. TURK.